United States Patent [19]
Fujiwara et al.

[11] Patent Number: 5,156,245
[45] Date of Patent: Oct. 20, 1992

[54] ONE-WAY CLUTCH FREE FROM GEAR-TOOTH NOISE

[75] Inventors: Satoshi Fujiwara, Toyota; Tetsuaki Numata, Kitakatsuragi; Yoshihisa Miura, Yamatokooriyama; Takaaki Ikeda, Nara, all of Japan

[73] Assignee: Koyo Seikyo Co., Ltd., Osaka, Japan

[21] Appl. No.: 820,143

[22] Filed: Jan. 13, 1992

Related U.S. Application Data

[63] Continuation-in-part of Ser. No. 703,776, May 21, 1991, abandoned.

[30] Foreign Application Priority Data

Sep. 25, 1990 [JP] Japan ............... 2-100559[U]

[51] Int. Cl.⁵ .............................................. F16D 41/07
[52] U.S. Cl. .................................. 192/41 A; 192/45.1
[58] Field of Search .............. 192/41 R, 41 A, 45.1; 188/82.8

[56] References Cited

U.S. PATENT DOCUMENTS

| | | | |
|---|---|---|---|
| 2,834,445 | 5/1958 | Gorsky | 192/45.1 |
| 4,736,827 | 4/1988 | Kinoshita | 192/41 A |
| 4,961,486 | 10/1990 | Kinoshita et al. | 192/41 R |
| 5,076,408 | 12/1991 | Numata et al. | 192/41 A |

FOREIGN PATENT DOCUMENTS 2588340 4/1987 France .
1-307525 12/1989 Japan .
2190440 11/1987 United Kingdom ............. 192/41 A Primary Examiner—Richard Lorence
Attorney, Agent, or Firm—Wenderoth, Lind & Ponack

[57] ABSTRACT

An improvement is made on a one-way clutch having an inner ring, an outer ring having projections to be engaged with corresponding recesses of a housing, a plurality of engagement members disposed between the inner and outer rings, a cage for the engagement members, a spring member for forcing the engagement members in one direction, a pair of end bearings disposed in opposite lateral positions between the inner and outer rings, and a pair of end bearing retainer plates to be fitted on end faces of the outer ring. Grooves are respectively formed on opposite end portions of an outer peripheral surface of the projections of the outer ring at regular intervals in a circumferential direction. Each of the end bearing retainer plates is provided with fitting portions which are integrally formed around an outer periphery of the end bearing retainer plate at regular intervals and which are respectively engaged with the grooves of the outer ring. One of the end bearing retainer plates is also provided with spring portions which are integrally formed around the outer periphery and which axially project to rest against a part of the housing when placed in position in the housing.

5 Claims, 5 Drawing Sheets

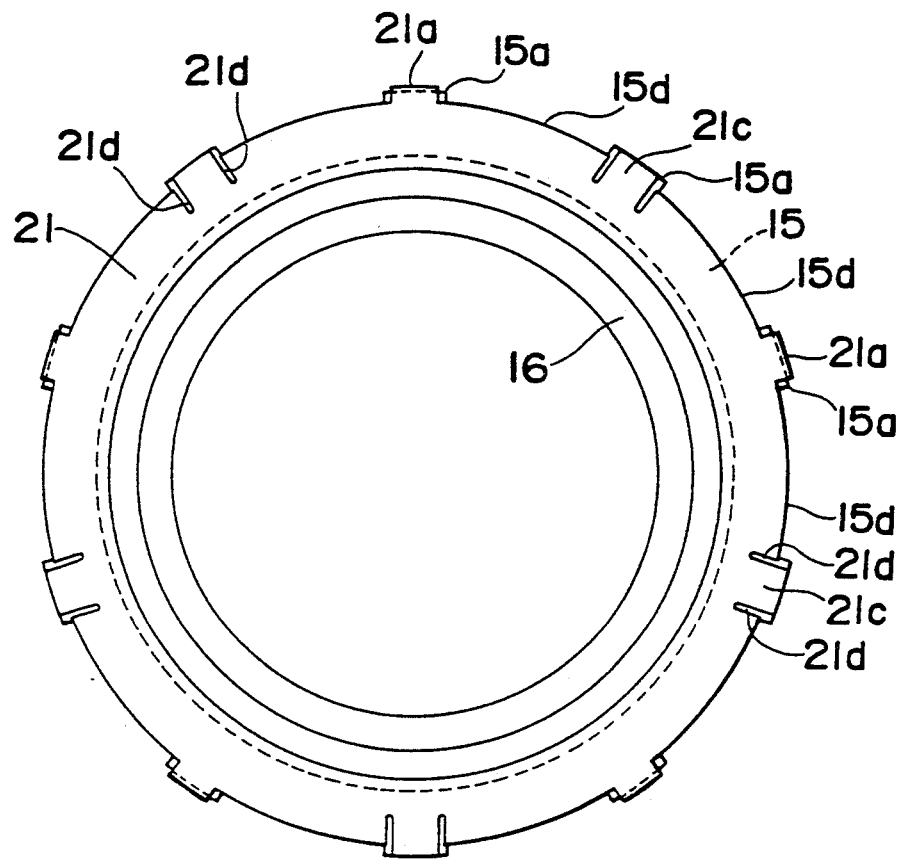
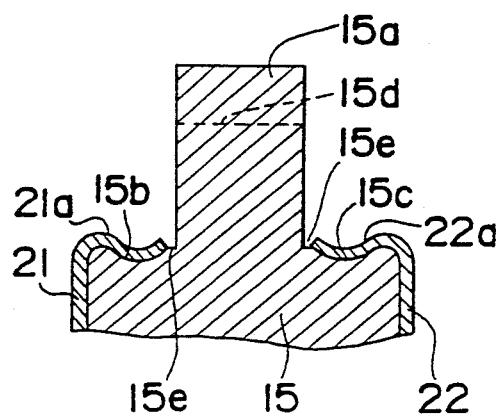
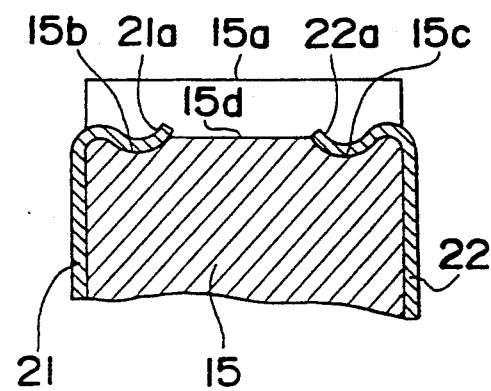

ONE-WAY CLUTCH FREE FROM GEAR-TOOTH NOISE

This application is a continuation-in-part of application Ser. No. 07/703,776, filed May 21, 1991 now abandoned.

BACKGROUND OF THE INVENTION

1. Field of the invention

The present invention relates to a one-way clutch used for an automatic transmission in an automobile for example and more particularly to a one-way clutch which incorporates an improved mechanical structure capable of securely preventing gear-tooth noise from occurring.

2. Description of the prior art

FIG. 5 shows a prior art one-way clutch which was proposed in the Japanese Laid-Open Patent Publication No. 1-307525 issued in 1989. As shown in FIG. 5, the one-way clutch has the following: an outer ring 2 which is mounted to a housing 1 by means of splines provided on an outer peripheral surface of the outer ring 2 and on an inner peripheral surface of the housing 1, an inner ring 3, a plurality of engagement members 4 which are respectively disposed between the inner and outer rings 3 and 2, a cage 5 which holds these engagement members 4 in specific positions, a spring member 6 which urges these engagement members 4 in one specific direction, a pair of end bearings 7 which are respectively disposed in opposite lateral positions between the inner and outer rings 3 and 2, and a pair of end bearing retainer plates 8 which are respectively secured to both end faces of the outer ring 2.

In the prior art one-way clutch shown in FIG. 5, a pair of snap rings 9 are secured to the housing 1 to cause a plate spring 10 disposed between one snap ring 9 and the outer ring 2 to press the outer ring 2 against the other snap ring 9. Thereby, the outer ring 2 is restrained from rotating around an axis and is also prevented from turning in conjunction with the inner ring 3 when the inner ring 3 reverses the direction of the rotation. Due to this mechanical structure, the prior one-way clutch prevents occurrence of gear-tooth noise which otherwise would be caused by collision of the projection of the housing 1 with projections (gear teeth) of the outer ring 2.

However, since the above one-way clutch needs a large plate spring 10 which is a separate component part, production cost is apt to be increased and assembly operation is apt to be complicated and troublesome FIG. 6 shows another prior art proposing a solution to the problems inherent to the aforementioned one-way clutch of FIG. 5. According to this prior art, the movement of the outer ring 2 is adapted to be restrained by , inserting a wavy spring 11 between the housing 1 and the outer ring 2.

The newly proposed one-way clutch of FIG. 6, however, still needs a wavy spring 11 as a separate component part, and yet, the proposed one-way clutch generates another problem that because the outer ring 2 is pressed radially inwardly by the spring force of the wavy spring 11, the end bearings 7 are eventually caused to wear.

SUMMARY OF THE INVENTION

Therefore, the object of the present invention is to provide a novel one-way clutch which is free from the problem of such a gear-tooth noise due to collision of the projections of the outer ring with the corresponding recesses of the housing, which can dispense with a separate component such as a plate spring, and which is capable of securely preventing the end bearings from wearing.

To achieve the above object, the present invention provides a one-way clutch which comprises an outer ring which is provided with a plurality of projections on an outer circumferential surface of the outer ring, said projections being fitted in corresponding recesses of a housing when the one-way clutch is installed in the housing; an inner ring provided coaxially with said outer ring; a plurality of engagement members which are respectively disposed between said inner and outer rings; a cage for holding said engagement members in position; a spring member for forcing said engagement members in one specific direction; a pair of end bearings which are disposed in opposite lateral positions between said inner and outer rings; and a pair of end bearing retainer plates which are respectively fitted onto end faces of said outer ring, and which is characterized by grooves which are respectively formed on opposite end portions of said outer peripheral surface of said outer ring at regular intervals in a circumferential direction: fitting portions which are integrally formed around an outer periphery of each of said end bearing retainer plates at specified intervals and which are respectively engaged with said grooves of said outer ring; and spring portions which are integrally formed around said outer periphery of one of said end bearing retainer plates at specified intervals and which axially project to rest against a part of said housing when the one-way clutch is placed in position in the housing.

Assembling of the one-way clutch is done in the following manner.

First, the engagement members, the cage, and the pair of end bearings are assembled together between the inner and outer rings. Next, the end bearing retainer plates are placed in position on both end faces of the outer ring by engaging the fitting portions of each end bearing retainer plate with the grooves of the outer ring. Advantageously, the end bearing retainer plates with the structure according to the present invention can be mounted in place by a single action.

Next, the one-way clutch thus obtained is pressed in an axial direction into the housing with the projections of the outer ring being fitted into the respective recesses of the housing. And then, the spring portions of the one end bearing retainer plate is brought into contact with a part of the housing. Next, a snap ring, for example, is secured to the housing on the side of the other end bearing retainer plate so that the outer ring is pressed onto the snap ring through the other end bearing retainer plate by the spring force of the spring portions of the one end bearing retainer plate. In this way, installation of the one-way clutch in the housing is completed.

According to the one-way clutch of the present invention, since the other end bearing retainer plate is axially pressed onto the snap ring by the spring force of the spring portions of the one end bearing retainer plate, a space in the housing for receiving the one-way clutch can be provided with a comparatively large dimensional tolerance. This improves workability and prevents axial backlash or looseness from occurring.

In addition, the spring force of the spring portions prevents looseness due to inclination of the outer ring and therefore prevents wobble from occurring. Furthermore, frictional force generated by the spring force between the one-way clutch and the housing restrains the outer ring from turning around a rotational axis. , Therefore, even when the inner ring idles, the outer ring is securely prevented from turning in conjunction with the inner ring, and thereby gear-tooth noise is securely prevented from occurring, which otherwise would be caused by the projections of the outer ring hitting surfaces defining the corresponding recesses of the housing.

The one-way clutch can dispense with separate components like a plate spring, a wavy spring or the like, which are required in the aforementioned prior art one-way clutches. This decreases the number of components, resulting in a decreased cost.

Furthermore, the outer ring is pressed in the axial direction by the spring portions, unlike the prior art in which a wavy spring is used and the outer ring is pressed in the radial direction by the wavy spring. Therefore, the end bearings are prevented from wearing.

Furthermore, according to the one-way clutch of the present invention, since the direction in which the one-way clutch is installed into the housing can easily be determined by the spring portions, there is no fear of fitting the one-way clutch in the housing in a wrong direction.

It is to be noted that it is possible to generate a considerable amount of deflection and spring force by radially outwardly projecting the spring portions.

In an embodiment of the present invention, the spring portions are formed in portions of the one end bearing retainer plate which do not oppose the projections of the outer ring. In this case, the spring portions rest against the external housing unit in places facing recesses of the outer ring.

BRIEF DESCRIPTION OF THE DRAWINGS

The present invention will become more fully understood from the detailed description given hereinbelow and the accompanying drawings which are given by way of illustration only, and thus are not limitative of the present invent wherein:

FIG. 2 is a front view of the one-way clutch of FIG. 1;

FIG. 3 is a sectional view showing fitting portions of an outer ring for comparison with the fitting portions according to the embodiment shown in FIG. 1;

FIG. 4 is a sectional view of a modification of the fitting portions of FIG. 1;

DETAILED DESCRIPTION OF THE PREFERRED EMBODIMENTS

Referring now to the accompanying drawings, an improved one-way clutch according to an embodiment of the invention is described below.

Figure 1:
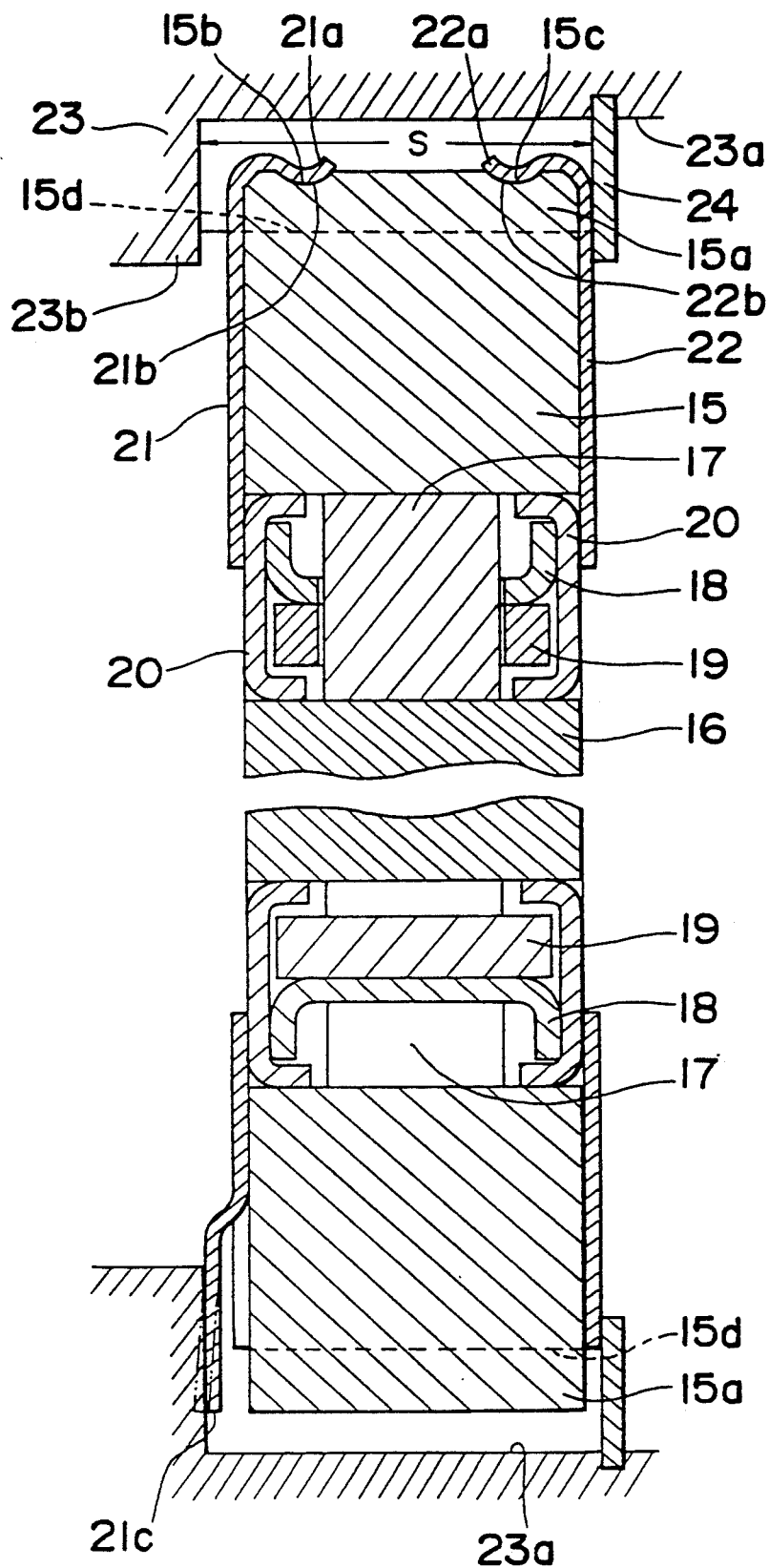
FIG. 1 is an enlarged sectional view of a one-way clutch according to an embodiment of the present invention.
Figure 5:
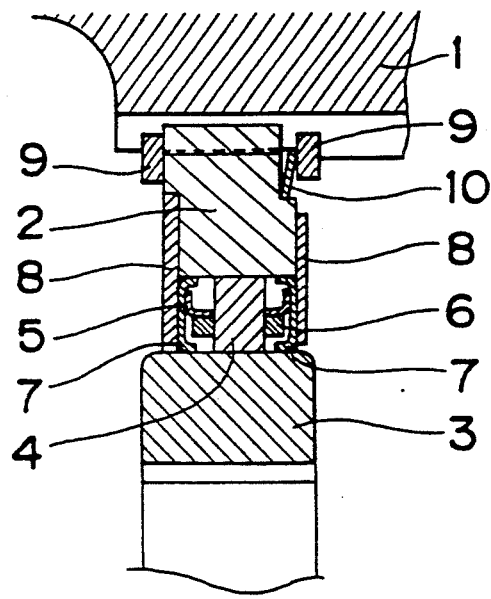
FIG. 5 is a sectional view of a prior art one-way clutch.
Figure 6:
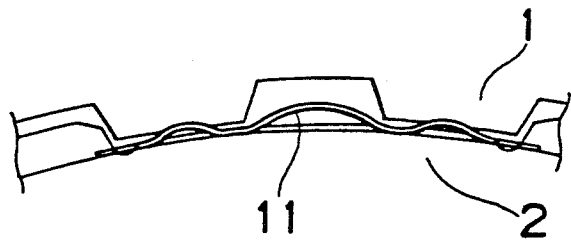
FIG. 6 is a front view of main components of another prior art one-way clutch.

As shown in FIGS. 1 and 2, the improved one-way clutch basically has an outer ring 15, an inner ring 16, a plurality of engagement members 17, a cage 18, a spring member 19, a pair of end bearings 20, and a pair of end bearing retainer plates 21 and 22.

A plurality of projections 15a (ten, for example) are formed on an outer peripheral surface of the outer ring 15 at equal angular intervals.

Every other projection 15a of the outer ring 15 has a pair of grooves 15b, 15c on axially opposite end portions of the outer peripheral surface of the projection 15a.

The engagement members 17, the cage 18 for holding these engagement members 17, and the spring member 19 for forcing these engagement members 17 in one specific direction are respectively disposed in an axially center position between the outer ring 15 and the inner ring 16. The pair of end bearings 20 are disposed in opposite lateral positions between the outer ring 15 and the inner ring 16.

Since functional operations of these engagement members 17, cage 18, spring 19, and end bearings 20 are well known and not directly related to the present invention, a detailed description of these components is omitted here.

An outer periphery or circumferential edge of each of the end bearing retainer plates 21 and 22 is provided with a diameter being almost identical to that of an outer peripheral surface of recesses 15d defined between the projections 15a of the outer ring 15. These end bearing retainer plates 21 and 22 are respectively provided with a plurality of fitting portions 21a and 22a formed integrally around the respective outer peripheries. The fitting portions 21a and 22a extend radially outward in correspondence with the projections 15a having the grooves 15b and 15c, and curve in the axial direction along the outer peripheral surface of those projections 15a. These fitting portions 21a and 22a are respectively provided with protuberances 21b and 22b which are respectively engaged with the grooves 15b and 15c of the projections 15a.

Furthermore, the end bearing retainer plate 21 is integrally formed around the outer periphery between the fitting portions 21a. The spring portions 21c extend radially outward in correspondence with the projections 15a are devoid of the grooves 15b and 15c, and bend in the direction opposite from the direction in which the fitting portions 21a turn. A pair of notches 21d are provided on both sides in a circumferential direction of each spring portion 21c.

In short, the fitting portions 21a and the spring portions 21c are alternately formed integrally around the outer periphery of the one end bearing retainer plate 21, whereas only fitting portions 22a are provided integrally around the outer periphery of the other end bearing retainer plate 22 in correspondence with every other projection 15a.

On the other hand, a housing 23 for accommodating the one-way clutch is provided with a plurality of recesses 23a which are engaged with the projections 15a of the outer ring 15. The housing 23 is provided with a step portion 23b which are opposite to the one end bearing retainer plate 21 mounted on the outer ring 15. A snap ring 24 is secured to the housing 23, opposite to the other end bearing retainer plate 22. In place of the step portion 23b, an additional snap ring may be installed to the housing 23. In this case, this additional snap ring is regarded as part of the housing 23.

The one-way clutch with the above structure is completed in the following manner. First, the plurality of engagement members 17, cage 18, spring member 19, and end bearings 20 are placed in position between the inner and outer rings 16 and 15. Next, the end bearing retainer plates 21 and 22 are respectively mounted in place in a manner sandwiching both end faces of the outer ring 15 by engaging the fitting portions 21a and 22a of each end bearing retainer plate 21, 22 with the grooves 15b and 15c on the projections 15a of the outer ring 15, respectively.

Due to a spring action of the fitting portions 21a and 22a of the end bearing retainer plates 21 and 22 and an effect of engagement of those protuberances 21b and 22b with those grooves 15b and 15c, the end bearing retainer plates 21 and 22 are respectively secured to the outer ring 15 with a single action, thus offering much convenience for implementing the assembly work.

Next, the one-way clutch is inserted in an axial direction into the housing 23 with the projections 15a of the outer ring 15 being fitted into the respective recesses 23a of the housing 23. And then, the spring portions 21c of the one end bearing retainer plate 21 is brought into contact with the step portion 23b of the housing 23.

Thereafter, the snap ring 24 is secured to the housing 23 on the side of the other end bearing retainer plate 22, resisting the spring force of the spring portions 21c. Thereby, the outer ring 15 is axially pressed onto the snap ring 24 through the other end bearing retainer plate 22 by the spring force of the spring portions 21c of the one end bearing retainer plate 21. In this way, installation of the one-way clutch in the housing is completed.

Since the direction in which the one-way clutch is inserted in the housing 23 can be easily determined by the aid of the spring portions 21c, there is no fear of installing the one-way clutch in the housing 23 in a wrong direction.

Furthermore, since the outer ring 15 is kept urged against the snap ring 24 through the other end bearing retainer plate 22 by the spring force of the spring portions 21c after installation of the one-way clutch in the housing is completed, sufficient dimensional tolerance can be provided to an assembling space, indicated by S in FIG. 1, in the housing 23. This consequently offers a good workability. Also, wobble occurring in the axial direction is fully eliminated.

Furthermore, spring force of the spring portions 21c effectively prevents looseness due to inclination of the outer ring 15. In addition, frictional force, generated by the spring force, between the one-way clutch and the housing 23 restrains the rotation of the outer ring 15 around a rotational axis, so that the outer ring 15 is effectively prevented from rotating in conjunction with the inner ring 16 when the inner ring 16 idles. As a result, the one-way clutch of this embodiment securely prevents gear-tooth noise from occurring, which otherwise would be generated by the collision of the projections 15a of the outer ring 15 with surfaces defining the recesses 23a of the housing 23.

Furthermore, because the grooves 15b and 15c are formed on the outer peripheral surfaces of the projections 15a of the outer ring 15, a wider sectional area can be provided to the outer ring 15 than that available in case where, as shown in FIG. 3, the grooves 15b and 15c are formed at step portions 15e on both end faces of the outer ring 15. In consequence, an increased strength of the outer ring 15 is obtained.

Figure 7:
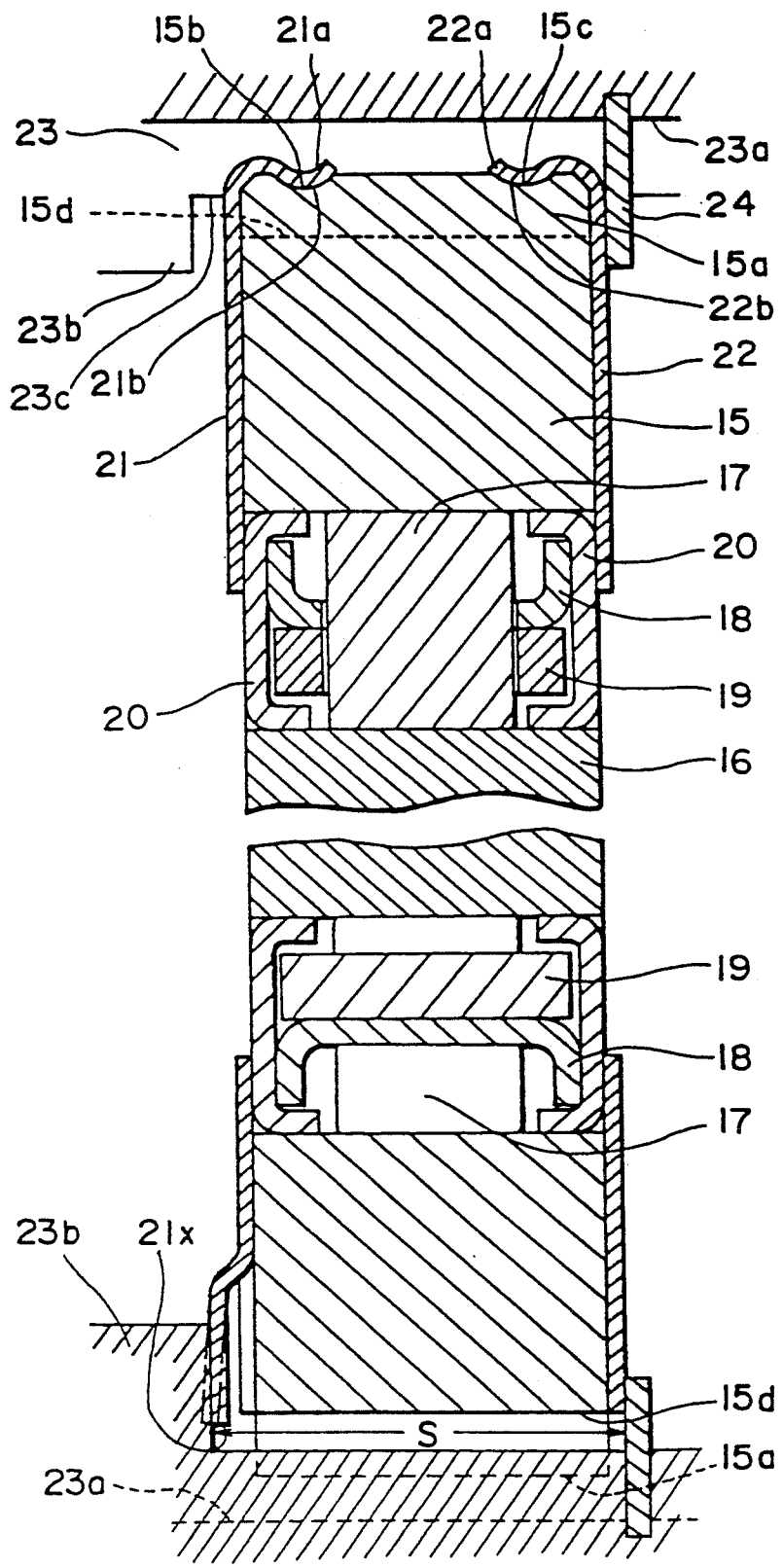
FIG. 7 is an enlarged sectional view of a one-way clutch according to another embodiment of the present invention.
Figure 8:
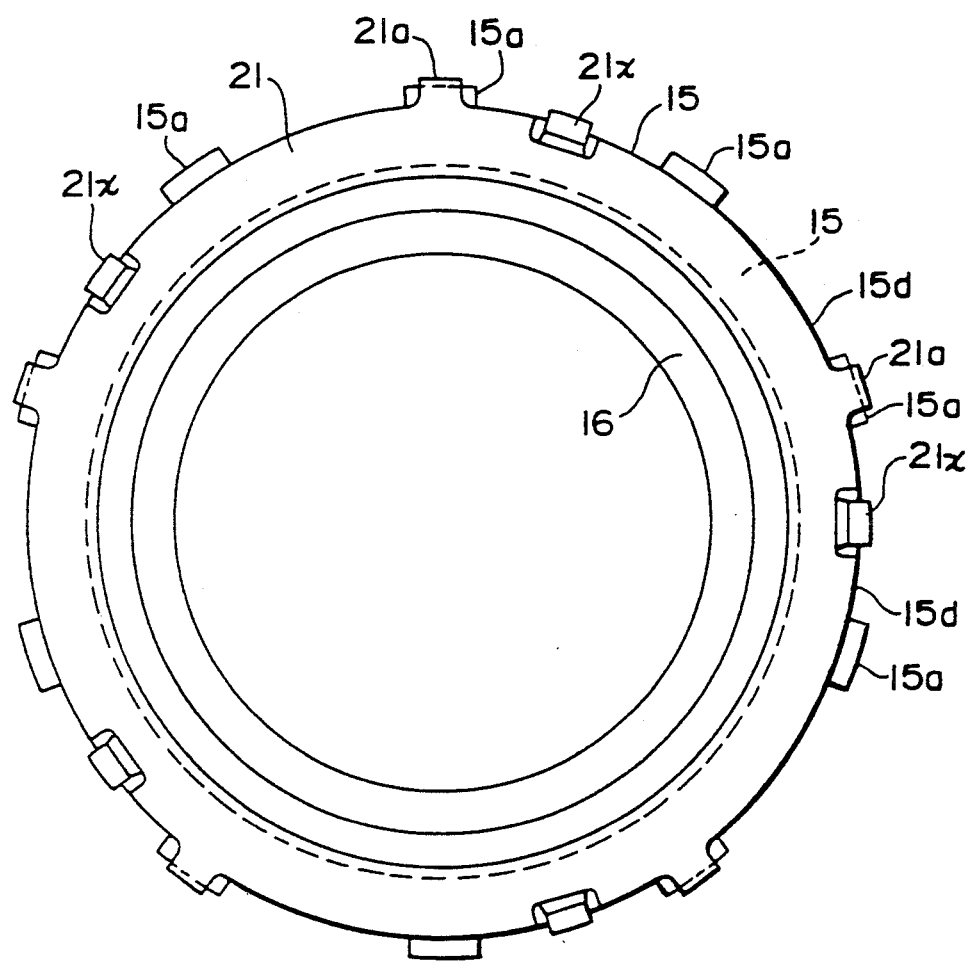
FIG. 8 is a front view of the one-way clutch of FIG. 7.

Referring next to FIGS. 7 and 8, a one-way clutch of another embodiment will be described below.

This embodiment is different from the above embodiment of FIGS. 1 and 2 only in that positions where the spring portions of the end bearing retainer plate 21 are formed are different. Therefore, in FIGS. 7 and 8, parts same as in the above embodiment are indicated by the same reference numbers shown in FIGS. 1 and 2 and a description of those parts will be omitted here.

In this embodiment, the end bearing retainer plate 21 has spring portions 21x in positions shifted from the projections 15a of the outer ring 15 in a circumferential direction, as shown in FIG. 8, such that the spring portions 21x do not oppose the projections 15a when the end bearing retainer plate 21 is mounted in place.

The spring portions 21x rest against the respective step portions 23b provided to the projections 23c of the housing 23 which are received in the recesses 15d of the outer ring 15 as shown in FIG. 7, and not against the step portions 23b provided to the recesses 23a of the housing which receive the projections 15a of the outer ring 15.

The one-way clutch of this embodiment shown in FIGS. 7 and 8 can offer same effects and advantages as the one-way clutch of FIGS. 1 and 2 offers.

In both embodiments, the grooves 15b and 15c are formed on the outer peripheral surface of the outer ring 15 at the projections 15a. However, alternatively, the grooves 15b and 15c may be provided at the recesses 15d, as shown in FIG. 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A one-way clutch comprising:
   an outer ring which is provided with a plurality of projections on an outer circumferential surface of the outer ring, said projections being fitted in corresponding recesses of a housing when the one-way clutch is installed in the housing;
   an inner ring provided coaxially with said outer ring;
   a plurality of engagement members which are respectively disposed between said inner and outer rings;
   a cage for holding said engagement members in position;
   a spring member for forcing said engagement members in one specific direction;
   a pair of end bearings which are disposed in opposite lateral positions between said inner and outer rings; and
   a pair of end bearing retainer plates which are respectively fitted onto end faces of said outer ring;
   characterized by:
   grooves which are respectively formed on opposite end portions of said outer peripheral surface of said outer ring at regular intervals in a circumferential direction:
   fitting portions which are integrally formed around an outer periphery of each of said end bearing retainer plates at specified intervals and which are respectively engaged with said grooves of said outer ring; and
   spring portions which are integrally formed around said outer periphery of one of said end bearing retainer plates at specified intervals and which axially project to rest against a part of said housing when the one-way clutch is placed in position in the housing.

2. The one-way clutch according to claim 1, wherein said grooves are formed at said projections of said outer ring.

3. The one-way clutch according to claim 1, wherein said grooves are formed at recesses between said projections of said outer ring.

4. The one-way clutch according to claim 1, wherein said spring portions extend radially outwardly in correspondence with said projections of said outer ring.

5. The one-way clutch according to claim 1, wherein said spring portions are formed in portions of said one end bearing retainer plate which do not oppose the projections of said outer ring.

* * * * *

UNITED STATES PATENT AND TRADEMARK OFFICE
CERTIFICATE OF CORRECTION

PATENT NO. : 5,156,245
DATED : October 20, 1992
INVENTOR(S) : Satoshi Fujiwara, et. al.

It is certified that error appears in the above-indentified patent and that said Letters Patent is hereby corrected as shown below:

On the Title page, item [73], Assignee: for "Seikyo" should read --Seiko--.

Signed and Sealed this

Fifth Day of April, 1994

Attest:

BRUCE LEHMAN

*Attesting Officer*     *Commissioner of Patents and Trademarks*